Nov. 22, 1960 H. H. MORRIS 2,961,271
FOLDABLE GATE ASSEMBLY
Filed Nov. 5, 1957 4 Sheets-Sheet 1
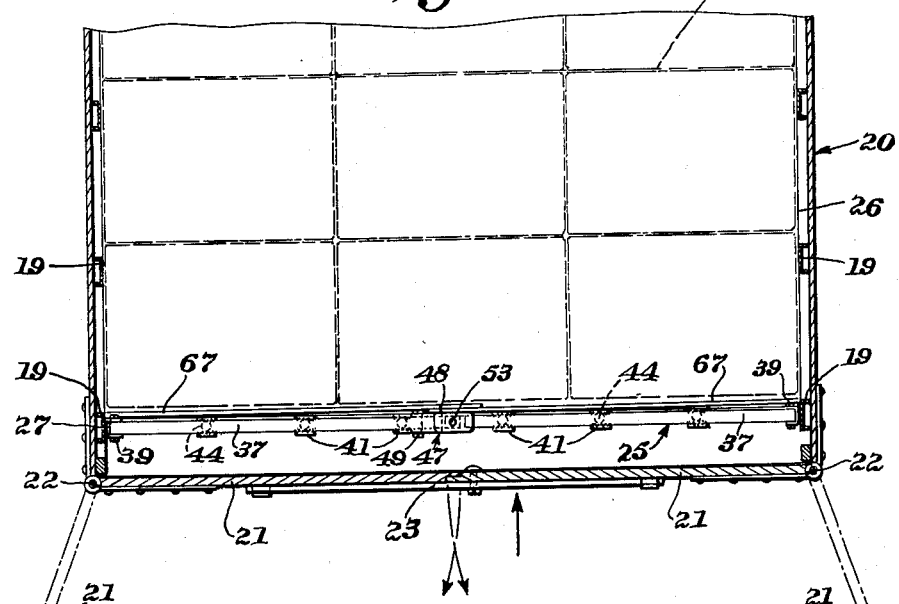
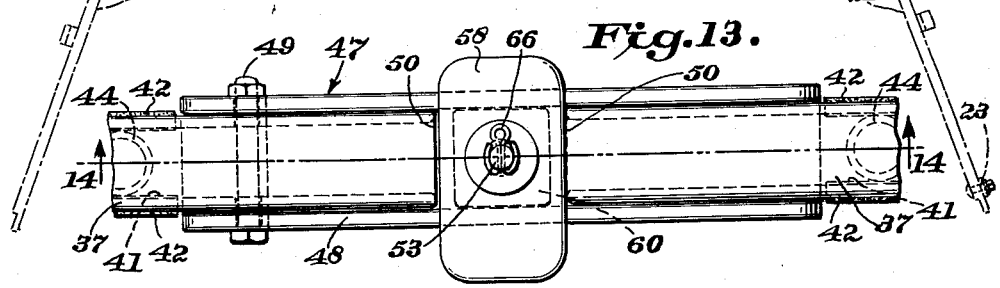
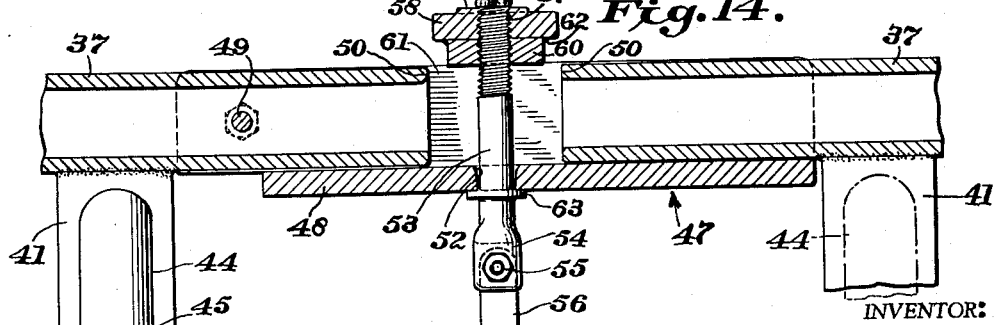
INVENTOR:
Harold H. Morris,
BY Cushman, Darby & Cushman
ATTORNEYS.

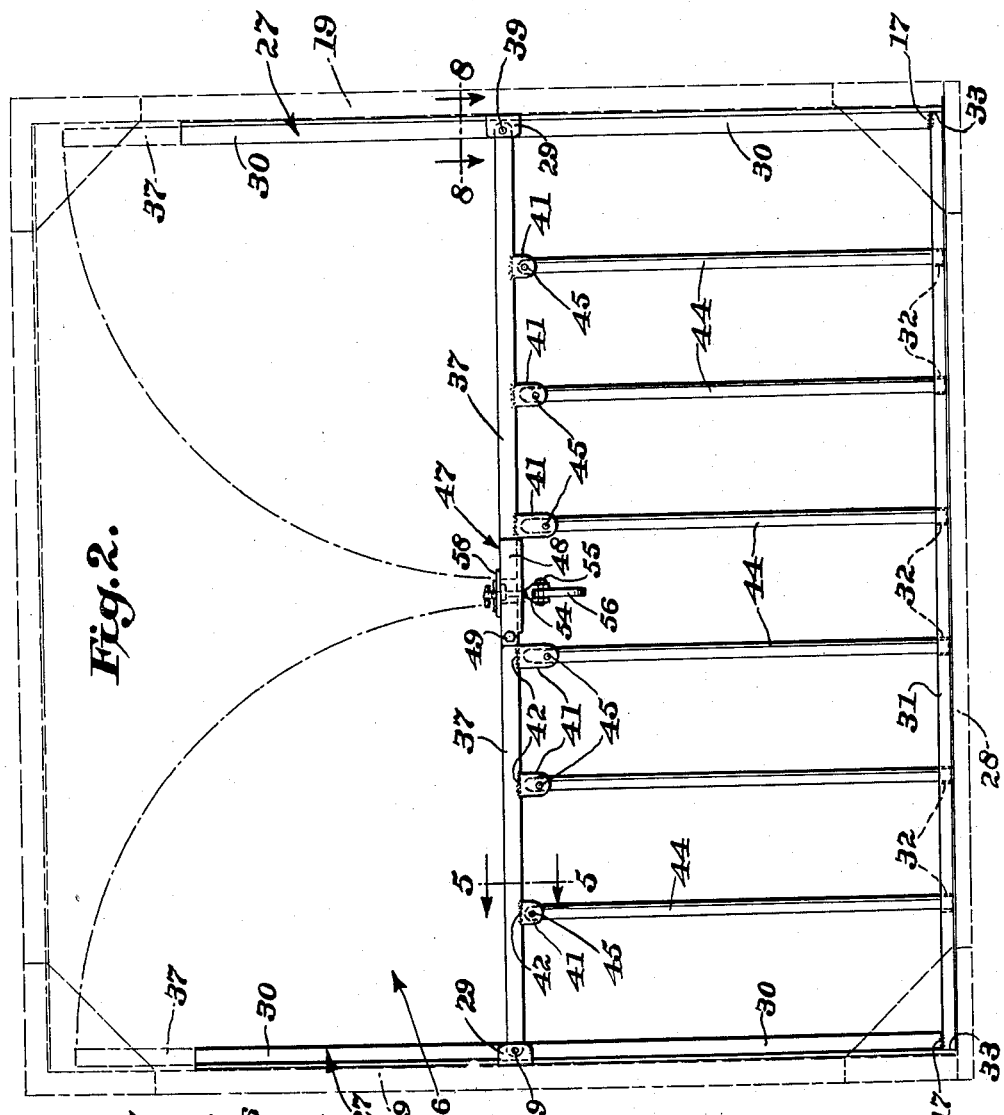

Nov. 22, 1960
H. H. MORRIS
2,961,271
FOLDABLE GATE ASSEMBLY
Filed Nov. 5, 1957
4 Sheets-Sheet 3
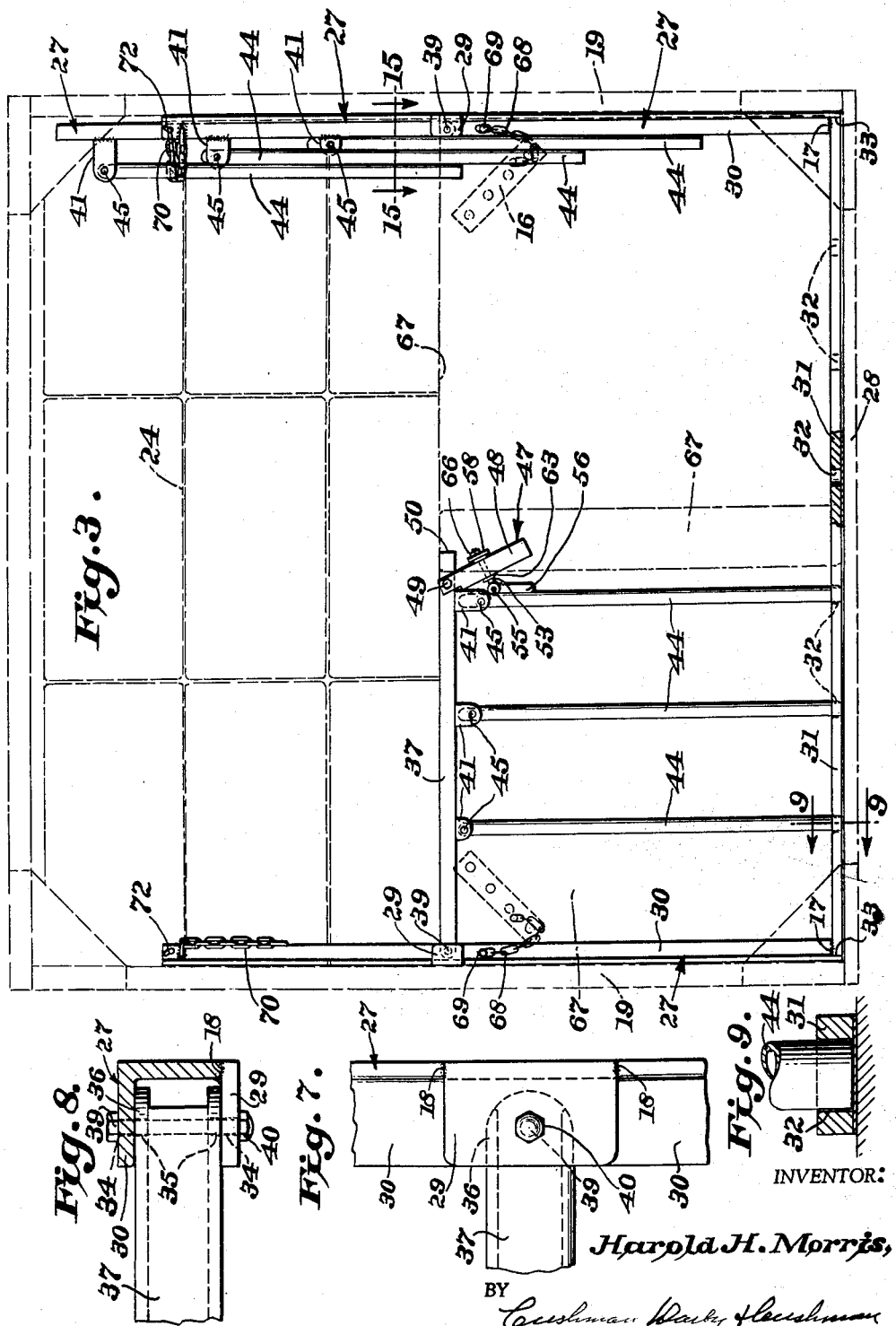
INVENTOR:
*Harold H. Morris,*
BY
ATTORNEYS Nov. 22, 1960
H. H. MORRIS
2,961,271
FOLDABLE GATE ASSEMBLY
Filed Nov. 5, 1957
4 Sheets-Sheet 4
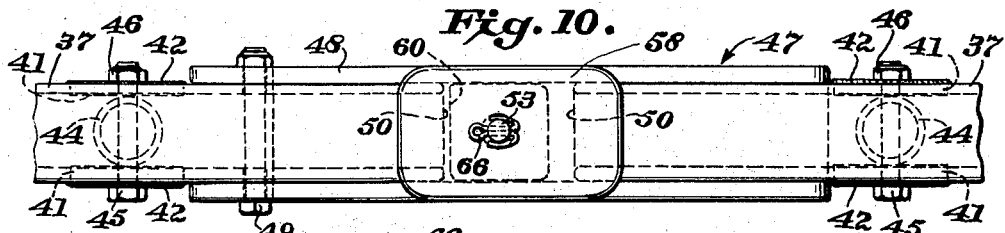
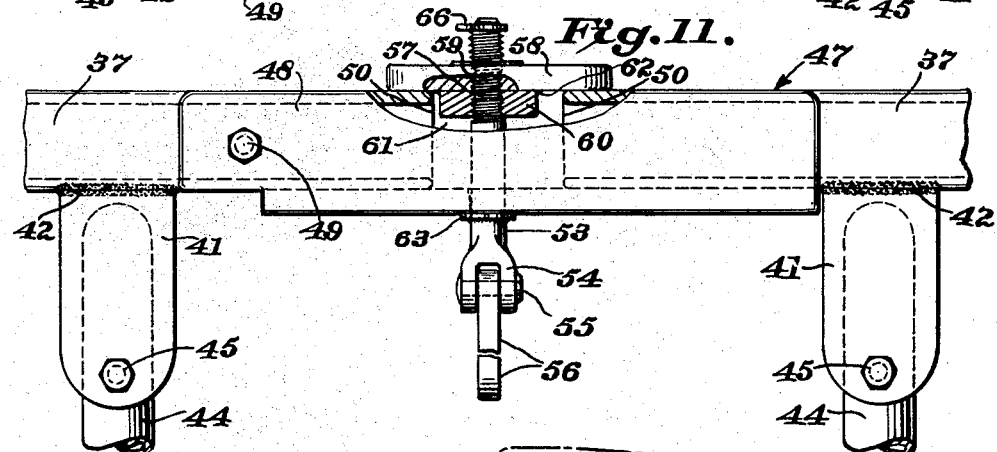
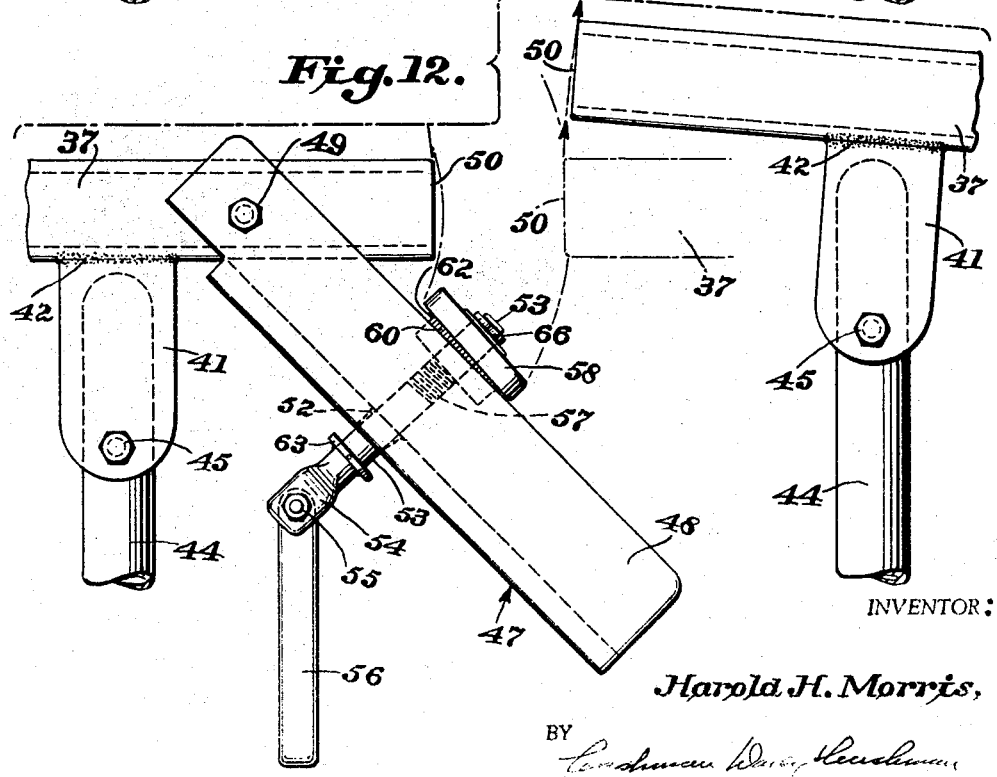
INVENTOR:
Harold H. Morris,
BY
ATTORNEYS.

United States Patent Office 2,961,271
Patented Nov. 22, 1960

2,961,271

FOLDABLE GATE ASSEMBLY

Harold H. Morris, 3507 Jones St., Omaha, Nebr.

Filed Nov. 5, 1957, Ser. No. 694,531

13 Claims. (Cl. 296—50)

The present invention relates to an improved gate assembly for preventing damage to cargo carried by a vehicle such as a truck trailer and the like.

An important object is to provide a simple, efficient and economical folding barrier gate for vehicles, provided with means for preventing the freight and cargo inside the vehicle from shifting and thus damaging the load or the outside vehicle door closure.

A further object is to provide a gate assembly designed to minimize freight losses and damage due to the shifting of the cargo or load encountered in "railroad piggy back" transportation. The term "piggy back" is used to mean any semi-trailer truck trailer that may be connected to a railroad flat car and be transported by rail for substantial distances rather than being towed by the conventional truck tractor on the public highways.

It has been found that "humping," switching, or starting long trains with "piggy back" trailers connected to the flat cars, causes the load inside a truck trailer to shift against the trailer closure or doors. This often happens with such force that not only the doors are damaged or broken but also the cargo. The foldable barrier gate assembly, constructed in accordance with the present invention, provides means for preventing damage to the equipment and merchandise while in transit and at a cost far less than the price of replacement of a truck trailer door or closure.

A still further object is to provide a gate closure assembly including a pair of coacting foldable gate arms with which are associated a novel locking mechanism, for releasably connecting the adjacent inner ends of the gate arms together, so that these arms or sections may be independently swung and maintained in an out of the way position, and without interfering with the loading of the cargo into the truck or the removal of the same therefrom. The locking mechanism includes an elongated channel member which is pivotally connected to one of the gate arms adjacent the inner end thereof so as to be moved into overlapping engagement with the confronting inner end of the other gate arm when these arms are in their horizontal closed position. Extending upwardly through the bottom of the channel member and substantially centrally thereof is a vertically displaceable operating rod to which is adjustable connected a clamping plate or member shaped to be rotated so as to overlap and extend substantially parallel with the confronting inner ends of the gate bars when the latter are in their closed position, and to be released therefrom by actuation of the operating rod so as to be disposed above and substantially transversely to the channel-shaped member in order to free the confronting inner ends of the gate arms from the locking mechanism.

Other objects and advantages of the invention will become apparent from the following description, when taken in conjunction with the accompanying claims and drawings.

Referring to the drawings:

Figure 1 is a sectional plan view of the rear end of a truck showing the improved folding barrier gate associated therewith and the truck doors in full lines in their closed position and in dotted lines in their opened position.

Figure 2 is an end view of Figure 1, looking in the direction of the arrow and with the doors of the truck open.

Figure 3 is an end view similar to Figure 2 showing one of the gate arms in its closed position and the other raised to its folded position.

Figure 4 is an enlarged detailed side view showing the connection of one of the supporting legs of the gate with a gate arm.

Figure 5 is a sectional view taken substantially along the line 5—5 of Figure 2.

Figure 6 is an enlarged detailed view showing the connection of a corner of the frame to the bottom of the truck.

Figure 7 is an enlarged detailed side view showing the connection of a gate arm to a vertical side of the gate frame.

Figure 8 is a sectional view taken substantially along the line 8—8 of Figure 2.

Figure 9 is an enlarged detailed sectional view taken substantially along the line 9—9 of Figure 3.

Figure 10 is a detailed plan view showing the gate arms retained in a closed position by the locking mechanism.

Figure 11 is a side view of Figure 10 with parts in section for the purpose of clearness of illustration.

Figure 12 is a detailed side view showing the gate arms and locking mechanism in their opened position.

Figure 13 is a plan view similar to Figure 10 but showing the locking mechanism in its released position.

Figure 14 is a sectional view taken substantially along the line 14—14 of Figure 13, and Figure 15 is a sectional view taken substantially along the line 15—15 of Figure 3.

Referring to the drawings, 20 indicates the rear end of a trailer truck or the like, which may be closed by the outer doors 21 hinged at their outer ends 22 to the adjacent rear sides of the truck (Figure 1). The inner ends of the doors 21, when swung to their closed position may be releasably connected by any suitable latch mechanism such as 23, and when the latch mechanism is released, the doors may be swung outwardly to their open position, as shown in dotted lines in Figure 1.

In order to prevent the cargo or freight 24, when the same is loaded into the truck, from shifting and damaging the cargo or the doors 21, a foldable barrier gate assembly generally indicated by the numeral 25 (Figure 1) is installed in the body 26 of the truck, so as to be spaced from the doors 21 when the latter are in their closed position. The gate assembly preferably includes vertically disposed fixed angle bars 27 adjacent opposite sides of the truck body and extending upwardly from the floor 28 to a point adjacent the top thereof (Figure 2). Each of the bars 27 is substantially L-shaped (Figure 8) and has welded thereto intermediate its ends, a short plate 29 as at 18, so as to be disposed substantially parallel to the arm 30 of the bars 27. Transversely disposed base bar 31 rests on the floor 28 and has longitudinally spaced sockets or openings 32. The lower ends of the arms 30 of the vertical bars 27 are notched as at 33, so that after the gate assembly is installed within the truck, the base or cross bar 31 may be welded thereto as at 17 (Figure 6). Each of the vertical angle bars 27 may be located adjacent a bracing upright 19 of the vehicle body.

The arm 30 of each of the vertical bars 27 and its associated plate 29, are provided with transverse aligned openings 34, which register with a complementary opening 35 in the outer end portion 36 of a foldable gate arm or bar 37 (Figure 8) that extends into the channel formed by the arm 30 and the plate 29 when the parts are assembled. A threaded bolt 39 extends through the aligned openings in the bar 27, plate 29, and gate arm 37 and is connected to a retaining nut 40 so as to pivotally connect each gate arm to its adjacent vertical bar 27.

The gate arms or sections 37 are substantially the same length and preferably are formed of square tubing (Figure 5). The gate arms 37 are provided with longitudinally spaced pairs of depending lugs 41 welded as at 42 to the bottom of the gate arm 37 so as to provide a space 43 for receiving the upper end of a supporting leg 44. A threaded retaining bolt 45 extends through aligned openings in the lugs 41, and the upper end portion of each of the leg portions 44 and is threaded to a nut 46 so as to pivotally connect each of the legs 44 to a gate arm. It will be noted that the length of each pair of lugs 41 progressively increases towards the inner ends of the gate arms (Figure 2) for a purpose subsequently to be described.

The pairs of lugs 41 are uniformly spaced apart so as to be substantially in vertical alignment with a socket 32 in the base 31 in order that when each gate arm 37 is swung about its pivot bolt 39 to its closed horizontal position, each of the legs 44 aligns with and is inserted into an adjacent socket 32 in order to firmly support and maintain the gate arm rigidly in a fixed position.

The gate locking mechanism is generally indicated in Figure 2 by the numeral 47 and preferably includes a substantially channel-shaped elongated member 48 pivoted at one end as at 49 to the inner end 50 of one of the gate arms 37 (Figure 12) so as to swing down therefrom when in its released or unlocked position. The channel member 48 is of such length that when swung upwardly to align with the arm 37 to which it is pivotally connected, it will also overlap the inner end of the adjacent coacting gate arm 37 (Figure 2) when the latter is moved to its horizontal closed position. In this closed position, the confronting inner ends 50 of the gate arms or sections 37, when the latter are in their horizontal closed position (Figure 11), are spaced from each other a short distance, and fit within the channel shaped member 48. The channel member 48, centrally thereof, has an opening 52 in the bottom thereof through which loosely extends a rotatable bolt or shaft 53 having a lower bifurcated end portion 54 (Figure 11) to which is pivotally connected at 55, a dependent operating handle 56. The upper end of the bolt 53 is threaded at 57 and extends above the member 48 so as to threadedly receive an elongated clamping member or holding plate 58 having a centrally disposed threaded opening 59 that engages the threaded portion 57 of the bolt 53. The clamping member 58 is of rectangular shape so as to be of greater length than width. Thus, the long side thereof may be rotated to overlap and engage the top of the channel member 48 or to be rotated substantially 90° (Figure 13) to overlap and be disposed substantially parallel to the inner ends 50 of the gate arms 37. A stop bar or member 60 is welded, as at 62, to the underside of the clamping member 58 (Figure 14) or may be integrally formed therewith so as to extend downwardly into the space 61 in order to prevent rotation of the long side of the member 58 when the handle 56 rotates the bolt 53 to move the clamping member 58 downwardly to frictional engagement with the channel member 48 (Figure 11), and the inner ends 50 of the gate bars.

A fixed lock washer or collar 63 on the bolt 53 is arranged to engage the bottom of the channel member 48 and serves as a stop to limit the upward movement of the bolt 53. A cotter pin 66 may extend through a transverse opening in the upper end of the operating bolt 53 so as to provide stop means for preventing the accidental removal of the clamping member 58 from the bolt 53.

A pair of sectional protectors 67, preferably formed of plywood, are arranged to extend across the inside width of the truck and to be interposed between the end gates 25 and the cargo 24. Each of the protectors 67 is secured to a strap 16 at one end, which in turn is connected to a flexible member or chain 68 that is detachably connected to a pin 69 on the vertical bar 27. These protectors are of a length approximately one-half of the width of the inside of the truck body and extend from the bottom 31 to a point above the gate arms or members 37 when the latter are in their horizontal closed position. Each of the protectors 67 is freely movable transversely of the truck to provide a protector for the cargo, and when not in use may be swung inwardly to an out-of-the-way position adjacent the sides of the truck body.

The gate arms 37 are shown in Figure 2 in their horizontal closed position, and each is arranged to be swung upwardly so as to fit within the angle bar 27 and releasably held in a fixed position in this upright position, by a chain or flexible member 70 having one end connected as at 71 to an angle bar 27, and of such a length as to be wrapped around the top leg 44 and be detachably connected to a pin 72 on the bar 27 so as to releasably maintain the gate arm 37 and its associated legs 44 evenly and with minimum door obstruction when the gate is being raised.

In operation, and assuming that the outside doors 21 are in their vertical open position and that the cargo 24, which, as shown, is in the form of separate boxes or cartons, is then loaded into the truck body. During this loading the gate arms 37 and their associated parts are in their raised or inoperative position adjacent the sides of the truck, and are maintained in this position by the safety chains 70 (Fig. 3). After the truck has been loaded, the protectors 67 are swung inside the truck in front of the cargo so as to extend across the width of the body. The chain 70 on one side of the truck is then released, allowing its associated gate bar 37 to swing downwardly to its horizontal position, as shown in the lefthand side of Figure 3. The lower ends of the legs 44 on the gate bar 37, as the latter moves to its horizontal position, sequentially fit within the floor sockets 32 starting with the legs nearest the sides of the vehicle body. The safety chain 70 is then released from the other gate bar 37 so as to allow the latter to swing downwardly into transverse alignment with the other gate bar 37. The locking mechanism 47 is then swung upwardly about its pivot 49 so that the confronting inner ends 50 of the gate bars 37 now extend from opposite sides into the channel member 48, but are separated from each other in order to provide the central space 61. The bolt 53 previously has been raised and the locking plate 58 rotated so that it is in its transverse position. The locking plate 58 is then turned so as to be disposed substantially parallel to the channel member 48, so that the bottom of the plate overlaps and engages the top of the confronting inner ends 50 of bars 37. The depending plate 60 now extends into the space 61 so that as the rod 53 is rotated to clamp the member 58 against the top of the confronting ends 50 of the gate bars 37, so that plate 60 will provide a keying action for preventing rotation of the plate 58.

Thus, it will be seen that the locking mechanism 47 provides simple and efficient means for releasably maintaining the gate arms 37 in their horizontal or closed position, and which is readily accessible and operable without the necessity of shifting or removing the cargo or freight 24. Moreover, the engagement of the inner confronting ends of the gate arms 37 with the channel member 48 serves to prevent lateral movement or displacement of the gate arms when in their closed horizontal position so that there is less tendency to side play of the cargo or excessive looseness of the parts. Additionally, engagement of the lower ends of the legs 44 with the walls of the sockets 32 prevent the possibility of these legs being accidentally withdrawn from their sockets due to sudden shock or vibrations. Because of the pivotal connection of the locking mechanism 47 with one of the gate arms 37 so as to swing downwardly therefrom, means are provided for permitting each of the gate sections, when raised to its inoperative vertical position, to rest snugly within the angle bar 27 without contacting the ceiling of the truck. As the gate arms 37 fold upwardly away from each other, either one of these arms may be retracted, so that it is not necessary for the gates to be moved in any particular manner or sequence.

The vertical angle bars 27 are connected to adjacent gate bar 37 so as to absorb the shock load due to the freight shifting inside the truck, rather than it being taken up primarily by the plates 29. The uneven length of the depending lugs or ears 41 on each of the gate bars 37 permits nesting of these legs evenly and within a very restricted space when the arms 37 are raised from their horizontal position to their folding or inoperative position. Thus, it will be seen that when the folding gates 25 are swung to their horizontal closed position, they coact to provide a rigid barrier for preventing damage to the cargo 24 or to the rear doors 21 and are reinforced by the protectors 67. Due to the firm connection of each of the bars 37 through the legs 44 with the floor base 31 and the releasable rigid connection of the inner confronting ends of the gate bars with each other through the instrumentality of the locking mechanism 47, the gate bars and their associated parts, when in their closed position, are prevented from being displaced. Thus, it will be seen that the folding barrier gate assembly can readily be installed in various types of vehicles and places that a gate or closure of this type is desired, and is so constructed as to occupy a minimum amount of space without interfering with the loading or unloading of the cargo or merchandise to be transported.

It has been found that the down swinging of the channel member 48 offers the mechanical resistance to back and forward motion of the center of the gate when the channel member 48 is locked to the confronting inner ends of the gate bar 37. In this connection it will be appreciated that back and forward motion of the gate sections must be held to the absolute minimum if the gate is to be efficient in operation. The foldable gate assembly is mounted immediately inside the truck and is spaced about four inches from the truck doors when the latter are closed.

While the foldable barrier gate assembly has been shown associated with a truck trailer, it will be manifest that it is equally efficient for use with various other types of vehicles, such as freight cars or the like.

As there is less tendency of upward force or movement being applied to the gate assembly when the latter is in its closed position, the channel-shaped locking member 48 is positioned so that its bottom and sides are closed and its top is open. Thus, it will be seen that when the locking bolt 53 is rotated by the handle 56 to clamp the plate 58 against the confronting inner ends of the gate bars 37, the possibility of the gate assembly buckling in any direction at its center point is minimized. Moreover, any severe shocks to which the gate assembly may be subjected due to sudden shifting of the cargo, are transferred or absorbed by the vertical angle bars 27, rather than being confined to weaker portions of the assembly. The "keying" action of the plate or lug 60 connected to the locking plate 58 provides means for preventing rotary slippage of the plate 58 when the locking handle 56 is being tightened, due to its engagement with the sides of the channel member 48 and the square ends of the gate arms 37, when the locking plate 58 is positioned parallel and in engagement with the gate arms 37. Thus, it will be seen that this keying action requires the loosening of the locking handle when the parts are in their locked position, and then lifting and turning the plate 58 through a quarter turn or 90° before the confronting ends 50 of the gate arms 37 may be removed from the channel member 48. This lift and turn procedure is necessary to disengage the keying action provided by the plate 60. In other words, unless the locking plate 58 is lifted and turned it will not permit the gate to be lifted even though the shaft 53 and locking handle 56 are completely loose. In the event of improper tightening of the locking handle 56 or the clamping member 58 becoming loose, the confronting ends 50 of the gate arms 37 will still be maintained in transverse alignment and in their locked position, due to the fact that the plate 60 will still remain within the space 61 and thus provide a keying action for preventing complete removal of the plate 58 from engagement with the confronting ends 50 of the gate bars 37 until the bolt 53 is raised to move it above the channel member 48.

Instead of a pair of coacting gate arms or sections 37 being employed, a single gate may be provided so as to be pivotally connected to one side of the vehicle body and extend across the same when the gate is in its closed position so as to be detachably connected to a suitable latching device. When the gate is moved to its open vertical position, it will be seen that, due to the progressive lengthening of the pairs of lugs 41, the legs 44 will assume a parallel folded position, and be retained in this position by the safety chain 70 or other suitable means.

It will be understood that the form of the invention shown is merely illustrative of a preferred embodiment and that such changes may be made as come within the scope of the following claims.

I claim:

1. In combination with a door closure for vehicles, a barrier gate assembly including a pair of foldable gate arms pivotally connected to opposite sides of the vehicle so as to be movable to extend across the vehicle to a substantially horizontally closed position, said arms being movable from their closed position to an open position at opposite sides of the vehicle and of such length that, when moved to their closed position, their confronting ends are spaced from each other, each of said gate arms having depending longitudinally spaced legs pivotally connected thereto and arranged when the gate arms are moved to their closed position to engage the bottom of the vehicle, locking means releasably connecting the confronting ends of the gates to each other when the latter are in their closed position, said locking means including an elongated channel-shaped member pivotally connected to a gate arm for receiving the confronting ends when the latter are moved into their closed position and the channel member is swung upwardly so as to be disposed substantially parallel with said arms, said confronting ends when inserted into the channel member being spaced from each other, and movable clamping means rotatably connected to said channel member and arranged to overlap and engage the confronting ends of the gate arms when the latter are moved to their closed position, and be rotated so as to be free from engagement with said arms so as to release the same.

2. In combination with a door closure for vehicles, a barrier gate assembly including a pair of foldable gate arms pivotally connected to opposite sides of the vehicle so as to be movable to extend across the vehicle to a substantially horizontally closed position, said arms being movable from their closed position to an open position at opposite sides of the vehicle and of such length that, when moved to their closed position, their confronting ends are spaced from each other, each of said gate arms having depending longitudinally spaced legs pivotally connected thereto and arranged when the gate arms are moved to their closed position to engage the bottom of the vehicle, locking means releasably connecting the confronting ends of the gates to each other when the latter are in their closed position, said locking means including an elongated channel-shaped member pivotally connected to a gate arm for receiving the confronting ends when the latter are moved into their closed position and the channel member is swung upwardly so as to be disposed substantially parallel with said arms, said confronting ends when inserted into the channel member being spaced from each other, said channel member having a central opening in the bottom thereof, an operating rod extending loosely through said opening and provided with an upper threaded end portion, a clamping plate having a threaded opening connected to said rod and arranged to overlap and engage the confronting ends of the gate arms when the latter are in their closed position and the channel member is moved to engage the same, and means for rotating said rod so as to move the clamping plate into locking engagement with the confronting ends of the gate member or away therefrom, and means connected to said clamping plate and engageable with opposite sides of the channel member for preventing rotation of the clamping member when the latter is being moved into locking engagement with the gate arms.

3. In combination with a door closure, as called for in claim 1, in which the channel member has an opening in the bottom thereof and the clamping means includes an operating rod extending loosely through said opening and provided with an upper threaded portion, and an elongated clamping plate having a central opening threaded to said rod and arranged to overlap and engage the top of each of the confronting ends of the gate arms when the latter are in their closed position and in engagement with the channel member, said clamping plate having a depending portion arranged to extend within the space between the confronting ends of the gate bars when the latter are in their closed position so as to engage the sides of the channel member and said gate arms in order to prevent rotation of the clamping plate when the latter is being moved into engagement with the gate arms, and means connected to said operating rod for rotating the same.

4. In combination with a door closure, as called for in claim 1, in which the channel member has an opening in the bottom thereof, and the clamping means includes a rotatable operating rod extending loosely through said opening so as to be axially slidable relative thereto, said rod having an upper threaded portion, a handle connected to the opposite end of said rod, means on said rod for limiting its movement into the channel member, a clamping plate having a threaded opening connected to the threaded portion of said rod, and means for preventing rotary slippage of the clamping plate when the same is being moved into locking engagement with the confronting ends of the gate bars.

5. In combination with a door closure for vehicles, a barrier gate assembly, including a supporting frame fixed within the body of a vehicle adjacent the door closure, said frame having vertical side bars, a pair of foldable gate arms, each of said arms having an outer end and an inner end, means pivotally connecting each of the outer ends to an adjacent side bar intermediate the length of the latter so that the same may be swung upwardly from a horizontal closed position to an opened vertical position, said gate arms being of such a length that when moved to their closed position their confronting ends are spaced from each other, each of said arms having longitudinally spaced depending lugs of progressively increasing length, and legs pivotally connected to said lugs for engaging the floor of the body to support the gate arms in their closed position, and means when the arms and legs are moved to their open position for maintaining the same against displacement.

6. In combination with a door closure, as called for in claim 5, in which said lugs are arranged in pairs which progressively increase in length from the outer ends of the gate arms towards the inner ends thereof when the gates are in their closed position.

7. In combination with a door closure, as called for in claim 5, in which said supporting frame includes a cross bar resting on the floor of the body of the vehicle, said cross bar having spaced sockets therein for receiving the legs when the gate arms are in their closed position.

8. In combination with a door closure for vehicles, a foldable gate pivotally connected to one side of the vehicle so as to extend across the same to a closed position, said gate being movable from its closed position to an opened vertical position adjacent one side of the vehicle, said gate having a series of longitudinally spaced depending lugs, and an elongated leg pivotally connected to each of said lugs, the length of said lugs increasing progressively from the pivoted to the free end of said gate so that when the gate is moved to its open vertical position the legs extend parallel to one another.

9. In combination with a door closure, as called for in claim 8, and including flexible means for maintaining the gate in its open position, said flexible means engaging the outer leg only of said gate so as to prevent displacement of the other legs.

10. A locking mechanism for connecting the confronting ends of a sectional closure, said mechanism including an elongated channel-shaped member pivotally connected to one of the sections of the closure and arranged to be swung substantially parallel therewith for receiving said confronting ends when the latter are moved into their closed position, the confronting ends of the closure being spaced from each other, said channel member having a central opening in the bottom thereof, an operating rod extending loosely through said opening, and clamping means operatively connected to said rod and arranged to releasably engage the confronting ends of said closure when said ends are positioned within the channel member so as to maintain them in a fixed locked position.

11. A locking mechanism as called for in claim 10, and further including means for preventing the removal of the clamping means from said rod.

12. A locking mechanism for connecting the confronting ends of a sectional gate closure, said mechanism including an elongated channel-shaped member pivotally connected to one of the sections of the closure and arranged to be swung substantially parallel therewith for receiving said confronting ends when the latter are moved into their closed position, the confronting ends of the closure being spaced from each other, said channel member having a central opening in the bottom thereof, an operating rod extending loosely through said opening, said rod having a threaded end portion extending outwardly from the channel member, an elongated clamping plate having a threaded opening connected to the threaded portion of said rod and arranged when the confronting ends are in their closed position and the channel member is moved to engage said confronting ends to be disposed substantially parallel with said confronting ends and be moved into fixed engagement therewith upon tightening of the operating rod, said clamping member having depending means arranged to extend into the space between said confronting ends to engage the opposite sides of the channel and the ends of the closure when said ends are in their closed position so as to prevent rotary slippage of the locking plate as the same is being moved into clamping engagement with said confronting ends by the actuation of said operating rod.

13. A locking mechanism for closure members having confronting inner ends, said mechanism including a channel member pivotally connected to one of the confronting ends, said confronting end being insertable into the channel member, said channel member having a central opening, a rotatable operating rod extending loosely through said opening so as to be axially slidable relative thereto, said rod having an upper threaded portion, a handle connected to the opposite end of said rod, means on said rod for limiting its movement into the channel member, a clamping plate having a threaded opening connected to the threaded portion of said rod, said clamping plate being movable to overlap and engage said confronting ends when the latter are positioned within the channel member, means operatively connecting said operating rod to said clamping plate for controlling its engagement with said confronting ends and means for preventing rotary slippage of the locking plate during rotation of said rod.

References Cited in the file of this patent

UNITED STATES PATENTS

| | | |
|---|---|---|
| 124,301 | Weeks et al. | Mar. 5, 1872 |
| 1,122,441 | Tobias | Dec. 29, 1914 |
| 1,615,300 | Cantrell | Jan. 25, 1927 |
| 2,523,760 | Hayner | Sept. 26, 1950 |
| 2,605,912 | Small et al. | Aug. 5, 1952 |
| 2,612,221 | Dellapent | Sept. 30, 1952 |
| 2,674,207 | Kerbaugh et al. | Apr. 6, 1954 |
| 2,827,958 | Lee | Mar. 25, 1958 |